United States Patent [19]

Ueda et al.

[11] Patent Number: 5,191,031
[45] Date of Patent: Mar. 2, 1993

[54] THERMOPLASTIC RESIN POLYMER HAVING IMPROVED MOLDABILITY AND HEAT RESISTANCE AND COMPOSITION

[75] Inventors: Sumio Ueda, Kimitsu; Sadao Ibe, Tokyo, both of Japan

[73] Assignee: Asahi Kasei Kogyo Kabushiki Kaisha, Osaka, Japan

[21] Appl. No.: 798,038

[22] Filed: Nov. 20, 1991

Related U.S. Application Data

[63] Continuation of Ser. No. 205,984, Jun. 13, 1988, abandoned.

[30] Foreign Application Priority Data

Dec. 2, 1987 [JP] Japan .................. 62-303365
Dec. 28, 1987 [JP] Japan .................. 62-329440

[51] Int. Cl.$^5$ .................................. C08F 283/08
[52] U.S. Cl. ........................... 525/392; 525/391
[58] Field of Search ............................ 525/391, 392

[56] References Cited

U.S. PATENT DOCUMENTS

| | | | |
|---|---|---|---|
| 3,356,761 | 12/1967 | Fox ........................ | 260/874 |
| 3,383,435 | 5/1968 | Cizek ...................... | 260/874 |
| 3,929,930 | 12/1975 | Izawa et al. ............. | 260/874 |
| 4,057,599 | 11/1977 | Cooper et al. .......... | 260/874 |
| 4,097,556 | 6/1978 | Toyama et al. ......... | 260/886 |
| 4,456,736 | 6/1984 | Miyashita et al. ...... | 525/392 |

FOREIGN PATENT DOCUMENTS

| | | | |
|---|---|---|---|
| 4540551 | 10/1967 | Japan . | |
| 4632427 | 4/1968 | Japan . | |
| 54-111177 | 8/1979 | Japan ................. | 525/392 |
| 637204 | 4/1981 | Japan ................. | 525/392 |
| 63-101451 | 10/1987 | Japan . | |

OTHER PUBLICATIONS

Chemical Abstracts, vol. 83, 1975, p. 36, abstract No. 11363k.

*Primary Examiner*—Jacob Ziegler
*Attorney, Agent, or Firm*—Pennie & Edmonds

[57] ABSTRACT

A novel thermoplastic resin polymer comprising a polyphenylene ether (POE) and a low molecular weight styrene polymer bonded to the PPE in an amount of from 0.1 to 5.0% by weight based on the PPE has been found to have excellent moldability and thermal stability properties, while maintaining the excellent properties inherent in PPE, such as transparency and heat resistance. The resin polymer can be prepared from a polyphenylene ether and a styrene monomer by polymerization in the absence of a radical polymerization initiator. When the novel thermoplastic resin polymer and a styrene polymer are blended into a composition, the composition is particularly excellent in physical properties, such as moldability, color tone, impact resistance, elongation and surface gloss.

4 Claims, No Drawings

THERMOPLASTIC RESIN POLYMER HAVING IMPROVED MOLDABILITY AND HEAT RESISTANCE AND COMPOSITION

This is a continuation of application Ser. No. 205,984, filed Jun. 13, 1989, now abandoned.

BACKGROUND OF THE INVENTION

1. Field Of The Invention

The present invention relates to a thermoplastic resin polymer and a composition. More particularly, the present invention is concerned with a novel thermoplastic resin polymer of a polyphenylene ether and a low molecular weight styrene polymer bonded to the polyphenylene ether in a limited amount, which thermoplastic resin polymer is excellent in moldability, heat resistance and transparency. The present invention is also concerned with a novel thermoplastic resin polymer composition comprising the above-mentioned thermoplastic resin polymer and a styrene polymer, which composition is excellent not only in moldability and color tone, but also in physical properties, such as impact resistance, elongation and surface gloss.

2. Discussion Of Related Art

Polyphenylene ethers (hereinafter often referred to simply as "PPE") generally have excellent mechanical strengths, electrical characteristics, heat resistance and transparency. However, PPE has a drawback in that its moldability is very poor because of its high melt viscosity. Particularly, when PPE is heated, the molecular weight of PPE is likely to increase due to the coupling between PPE molecules. When PPE has been subjected to severe thermal history, it undergoes gelation so that molding of PPE can no longer be conducted. In addition, discoloration of PPE, e.g., browning occurs when PPE has been subjected to thermal history.

In order to improve the moldability of PPE, U.S. Pat. No. 3,383,435 proposed a blend of PPE and a styrene resin (hereinafter often referred to simply as "PS"). However, the invention in this U.S. patent is not directed to the modification of PPE per se but is only directed to the improvement of melt processability of PPE by blending it with a PS. However, such blends have a disadvantage in that, when PS is used in an amount sufficient for obtaining satisfactory moldability of the blend, the heat resistance and mechanical properties such as impact resistance and tensile strength of the final product decrease considerably.

U.S. Pat. No. 3,356,761 discloses that when styrene is added to PPE, the styrene serves as a plasticizer so that the resultant mixture has melt processability at a temperature below the melting point of PPE per se. However, this effect is solely ascribed to the plasticizing performance of the styrene. Accordingly, when the mixture is subjected to melt processing, the styrene is polymerized to high degree in the presence of a crosslinking agent and the like, thereby causing the moldability of the mixture to be lowered.

On the other hand, methods have been proposed in which a styrene compound is graft polymerized on PPE to obtain a graft copolymer comprising PPE and a high molecular weight PS grafted thereon (see U.S. Pat. Nos. 3,929,930 and 4,097,556). In these methods, in order to promote graft polymerization of a high molecular weight PS on PPE, the graft polymerization is conducted in the presence of a radical polymerization initiator under specific conditions with respect to the amount of styrene compound, reaction temperature and mixing. However, as a result of the graft polymerization reaction in the presence of the radical initiator under heating, not only the graft polymerization but also the coupling reaction between PPE molecules are promoted, thereby causing the molecular weight of PPE to be increased. Consequently, the moldability of the resultant graft polymer at high temperatures is not sufficiently improved as compared to that of PPE per se. At the same time, the molecular weight of PS tends to increase during the course of the graft polymerization reaction, so that the resultant graft polymer not only becomes poor in heat resistance but also undergoes discoloration. Further, when PPE is used in combination with a rubber-modified polystyrene, another problem is caused by the use of a radical polymerization initiator. That is, the rubbery polymer used as an impact modifier is likely to undergo severe gelation by the action of the radical polymerization initiator, so that the impact strength of the resultant polymer becomes poor.

SUMMARY OF THE INVENTION

The present inventors have made extensive and intensive studies with a view toward developing a melt processable PPE material having excellent moldability and a high thermal stability while maintaining the advantageous properties inherent in PPE, such as heat resistance, mechanical strengths and electrical characteristics. As a result, it has unexpectedly been found that a novel thermoplastic resin polymer comprising a polyphenylene ether and a low molecular weight styrene polymer bonded to the polyphenylene ether in a limited amount, is excellent in the above-mentioned properties, especially with regard to moldability and thermal stability. It has also been found that a composition comprising the above-mentioned thermoplastic resin polymer and a styrene polymer is particularly excellent in physical properties, such as moldability, color tone, impact resistance, elongation and surface gloss. The present invention is provided on the basis of these findings.

It is therefore an object of the present invention to provide a thermoplastic resin polymer of a polyphenylene ether type which is excellent in moldability and thermal stability while maintaining the excellent properties inherent in PPE.

It is another object of the present invention to provide a novel thermoplastic resin polymer composition comprising the present thermoplastic resin polymer and a styrene polymer, which is particularly excellent in physical properties, such as moldability, color tone, impact resistance, elongation and surface gloss.

The foregoing and other objects, features and advantages of the present invention will be apparent to those skilled in the art from the following detailed description and appended claims.

DETAILED DESCRIPTION OF THE INVENTION

In one aspect of the present invention, there is provided a thermoplastic resin polymer having improved moldability and heat resistance, comprising a polyphenylene ether and a low molecular weight styrene polymer bonded to said polyphenylene ether, said low molecular weight styrene polymer having a number average polymerization degree of not greater than 10 and being present in an amount of from 0.1 to 5.0 % by weight, based on the weight of said polyphenylene ether.

PPE is generally known and described for example, in U.S. Pat. Nos. 3,306,874, 3,306,875, 3,257,357 and 3,257,358.

In the present invention, a polyphenylene ether (PPE) means not only a homopolymer represented by the following formula:

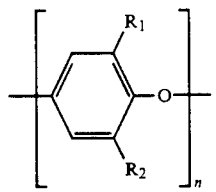

wherein $R_1$ and $R_2$ each independently represent an alkyl, hydroxyalkyl or haloalkyl group having from 1 to 4 carbon atoms, a halogen atom or a hydrogen atom, and n is an integer denoting the degree of polymerization, but also a polyphenylene ether copolymer comprising at least 70% by weight, based on the weight of the copolymer, of a component represented by the formula (I). Representative examples of homopolymers represented by the formula (I) include poly(2,6-dimethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether. Of these homopolymers, particularly preferred is poly(2,6-dimethyl-1,4-phenylene) ether. Representative examples of polyphenylene ether copolymers include a copolymer of 2,6-dimethylphenol and 2,3,6-trimethylphenol.

PPE to be used in the present invention preferably has an intrinsic viscosity of from 0.30 to 0.75 dl/g, more preferably from 0.35 to 0.70 dl/g as measured at 30° C. in chloroform. When the intrinsic viscosity is lower than 0.30 dl/g, the mechanical strengths of the resin polymer and composition are unsatisfactory. On the other hand, when the intrinsic viscosity is higher than 0.75 dl/g, the moldability of the resin polymer and composition becomes poor.

The intrinsic viscosity is determined from the ratio of the specific viscosity of a solution of PPE in chloroform to the PPE concentration of the solution through extrapolation to zero concentration. The specific viscosity was measured using a Ubbelohde's viscometer.

When PPE is poly(2,6-dimethyl-1,4-phenylene)ether, the relation between the number average molecular weight $\overline{M}n$ and the intrinsic viscosity $[\eta]$ is represented by the following equation:

$$[\eta] = 1.47 \times 10^{-4} [\overline{M}n]^{0.85}$$

wherein $[\eta]$ is the intrinsic viscosity as measured at 30° C. in chloroform.

The low molecular weight styrene polymer bonded to the PPE can be a low molecular weight styrene homopolymer (polystyrene) or a low molecular weight copolymer of styrene and a carbon-carbon double bond-containing compound copolymerizable with styrene in which the carbon-carbon double bond-containing compound is present in an amount of 30% by weight or less based on the weight of the copolymer. Representative examples of low molecular weight copolymers of styrene and a carabon-carbon double bond-containing compound include a styrene-α-methylstyrene copolymer, styrene-methyl methacrylate copolymer, styrene-acrylonitrile copolymer and styrene-maleic anhydride copolymer. Of these low molecular weight styrene polymers, a polystyrene is particularly preferred.

The number average polymerization degree of the low molecular weight styrene polymer bonded to PPE is not greater than 10, preferably from 5.5 to 8.0. When the number average polymerization degree of the styrene polymer exceeds 10, an increased amount of the styrene polymer is needed for attaining the improvement of the thermal stability of the polymer. However, the use of the styrene polymer in an increased amount is disadvantageous in that the heat resistance of the polymer is lowered and the effect of improving the moldability of the polymer is also lowered. The number average polymerization degree can be determined by the methods described below.

The amount of low molecular weight styrene polymer having a number average polymerization degree of not greater than 10 is within the range of from 0.1 to 5.0% by weight based on the weight of PPE. As described above, the low molecular weight styrene polymer is defined to include not only a styrene homopolymer but also a copolymer of styrene and a comonomer as described above. The term "amount of the low molecular weight styrene polymer" as used herein is intended to mean the amount of styrene units contained in the low molecular weight styrene polymer, exclusive of the amount of any comonomer units. When the amount is less than 0.1% by weight, the thermal stability and melt flow characteristics of the polymer are unsatisfactory. On the other hand, when the amount is greater than 5.0% by weight, not only is the heat resistance such as heat distortion resistance too low, but also the thermal stability and melt flow characteristics become poor. If the thermal stability of the polymer is poor, a coupling reaction is likely to occur between PPE molecules, thereby increasing the molecular weight of the polymer to disadvantage. The amount of the low molecular weight styrene polymer is preferably from 0.5 to 3.0% by weight based on the weight of PPE. If the amount of the low molecular weight styrene polymer is within this preferred range, the polymer has a heat distortion temperature of 160° C. or more, preferably 175° C. or more.

In another aspect of the present invention, there is provided a process for preparing a thermoplastic resin polymer having improved moldability and heat resistance, comprising a polyphenylene ether and a low molecular weight styrene polymer bonded to said polyphenylene ether, said low molecular weight styrene polymer having a number average polymerization degree of not greater than 10 and being prenent in an amount of from 0.1 to 5.0% by weight, based on the weight of said polyphenylene ether, which comprises reacting a polyphenylene ether with a styrene monomer selected from the group consisting of styrene and a combination of styrene and at least one carbon-carbon double bond-containing compound copolymerizable with styrene at a temperature of not lower than 260° C. in the absence of a radical polymerization initiator.

The thermoplastic resin polymer of the present invention is prepared by blending PPE with a styrene monomer, and subjecting the resultant blend to reaction at a temperature of not lower than 260° C. under kneading.

The styrene monomer to be blended with PPE is used for forming a low molecular weight styrene polymer bonded to PPE by the reaction. In other words, the styrene monomer is a precursor of the low molecular weight styrene polymer. Therefore, the term "styrene monomer" used herein is intended to include not only styrene but also a combination of styrene and comonomer for forming the above-mentioned styrene copolymer which may be bonded to PPE according to the present invention.

As described above, the reaction temperature is not lower than 260° C., preferably from 260° C. to 330° C. When the reaction temperature is lower than the above range, for example, 235° C. as in Example 5 of U.S. Pat. No. 3,356,761, not only does the molecular weight of the styrene polymer bonded to the PPE become too high, but also the styrene polymer is poorly bonded to the PPE. This is apparent from the results of Comparative Example 4 described below. On the other hand, when the reaction temperature exceeds 330° C., the PPE is likely to be decomposed.

The reaction time is not specifically limited, but generally from about 1 to about 10 minutes.

In the process for obtaining the resin polymer of the present invention, no radical polymerization initiator is added to the reaction system. If a radical polymerization initiator is added to the reaction system, not only would the low molecular weight styrene polymer be likely to become bonded to the PPE in an excessively large amount, but also discoloration of the resultant resin polymer is likely to occur so that the color tone of the resin polymer becomes unsatisfactory.

The amount of the low molecular weight styrene polymer bonded to PPE also varies depending upon the ratio of PPE to the styrene monomer in the blend which is to be heated for the reaction. The styrene monomer is employed in an amount of from 1 to 30 parts by weight, preferably 2 to 20 parts by weight per 100 parts by weight of PPE.

By employing the above-mentioned reaction conditions, a low molecular weight styrene polymer having a number average polymerization degree of not greater than 10 which is bonded to PPE in an amount of 0.1 to 5.0% by weight based on the weight of PPE, can be formed.

The reaction is carried out under kneading and may suitably be performed using a kneader, a Labo Plastomill and an extruder. It is particularly preferred to use a twin screw extruder from the viewpoints of operational efficiency and productivety.

The amount of the low molecular weight styrene polymer in the resin polymer of the present invention can be measured by the following method, which was reported by A. Factor et al. in Journal Of Polymer Science, vol. 7B, page 205 (1969).

The desired product of the above-mentioned process is usually obtained in the form of pellets. The pellets are dissolved in methylene chloride. When the resultant solution is allowed to stand −5° C. for a whole day and night, an insoluble complex of the resin polymer and methylene chloride is formed. The complex thus formed precipitates, leaving the unreacted styrene dissolved in the methylene chloride. The complex is separated from the solution and washed with cooled methylene chloride. The complex is then heated at 140° C. for 1 hour under reduced pressure to evaporate the methylene chloride. The resultant purified resin polymer is subjected to infrared absorption spectrum analysis to determine the content of the styrene polymer in the resin polymer, i.e. the amount of the styrene polymer bonded to PPE.

For purpose of comparison, it was confirmed that PPE in a simple blend of PPE and styrene polymer has no styrene polymer bonded to the PPE. That is, separately, PPE was blended with styrene polymer PPE was isolated from the blend of PPE and styrene polymer in the same manner as described above. The isolated PPE was subjected to infrared absorption analysis to confirm that the isolated PPE had no styrene polymer bonded thereto.

With respect to the site where the low molecular weight styrene polymer is bonded to PPE, it is believed that when the PPE is poly(2,6-dimethyl-1,4-phenylene)ether, the low molecular weight styrene polymer is bonded to the methyl groups.

The number average polymerization degree of the low molecular styrene polymer bonded to PPE can be determined from nuclear magnetic resonance (NMR) measurements in which the intensity of a signal due to the terminal group of the low molecular weight styrene polymer is compared with the intensity of a signal due to the styrene units in the main chain of the low molecular weight styrene polymer. Alternatively, the number average polymerization degree of the low molecular weight styrene polymer can be determined by the method disclosed in U.S. Pat. No. 3,442,858, in which the PPE resin having a styrene polymer bonded thereto is treated with a reagent comprising metallic lithium and biphenyl to decompose the PPE moiety so that the styrene polymer is isolated and the isolated styrene polymer is subjected to gel permeation chromatography (GPC).

In the present invention, since no radical polymerization initiator is used for the reaction of PPE with a styrene monomer, the increase in the molecular weight of PPE due to coupling between PPE molecules is suppressed. Further, the low molecular weight styrene polymer is bonded to PPE in an amount as small as 0.1 to 5% by weight based on the weight of PPE. These contribute to the improvement of the PPE resin with respect to melt flow characteristics and color tone characteristics such as heat-discoloration resistance properties. Thus, the thermoplastic resin polymer of the present invention exhibits excellent heat resistance and moldability properties while maintaining the excellent properties inherent to PPE, namely, excellent mechanical properties and electrical characteristics such as stable insulating properties under any change in temperature and humidity.

The resin polymer of the present invention can be used advantageously in combination with a styrene polymer.

Accordingly, in a further aspect of the present invention, there is provided a thermoplastic resin polymer composition comprising:

(a) from 10 to 95 parts by weight of a thermoplastic resin polymer comprising a polyphenylene ether and a low molecular weight styrene polymer bonded to said polyphenylene ether, said low molecular weight styrene polymer having a number average polymerization degree of not greater than 10 and being present in an amount of from 0.1 to 5.0% by weight, based on the weight of said polyphenylene ether, and (b) from 5 to 90 parts by weight of a styrene polymer.

As the styrene polymer [component (b)] to be blended with the resin polymer according to the present invention, there may be employed those which are used for conventional compositions comprising PPE and a styrene polymer. They are described for example, in U.S. Pat. Nos. 3,383,435, 4,097,556 and 4,131,598. Examples of styrene polymers employable as component (b) include polystyrene and a copolymer of styrene and at least one carbon-carbon double bond-containing compound copolymerizable with styrene. Styrene polymers modified with rubber may also be used to advantage. Representative examples of copolymers of styrene and at least one of the carbon-carbon double bonds-containing compound include a styrene-acrylonitrile copolymer, a styrene-methyl methacrylate copolymer, a styrene-α-methylstyrene copolymer and a styrene-maleic anhydride copolymer. Representative examples of rubber-modified styrene polymers include a rubber-modified polystyrene, a rubber-modified styrene-acrylonitrile copolymer such as an acrylonitrile-butadiene-styrene copolymer (ABS), and a rubber-modified styrene-maleic anhydride copolymer. Further examples of styrene polymers to be blended with the resin polymer of the present invention include a styrene-butadiene block copolymer, a hydrogenated styrene-butadiene block copolymer and an adduct thereof with maleic anhydride which are described for example, in U.S. Pat. Nos. 3,639,508, 3,994,856, 4,167,507, 4,292,414, 4,578,429 and 4,657,970. As the hydrogenated styrene-butadiene block copolymer, one having at least 80% of its double bonds saturated with hydrogen atoms is preferred. Of these styrene polymers, polystyrene (PS), a rubber-modified polystyrene and a hydrogenated styrene-butadiene block copolymer are particularly preferred. This is because they have excellent compatibility with PPE and because an ultimate product derived from a composition comprising such a type of a styrene polymer has excellent physical properties. The above-mentioned styrene polymers may be used alone or in combination.

The molecular weight of styrene polymer is not specifically limited. In general, suitable polystyrenes have number average molecular weights of from about 70,000 to about 170,000 (see Encyclopedia of Polymer Science and Technology vol. 13, pages 358 and 403), and styrene-butadiene block copolymers have number average molecular weights of from about 50,000 to about 120,000, which consists of from about 10,000 to about 20,000 due to the styrene component and from about 40,000 to about 100,000 due to the butadiene component (see Encyclopedia of Polymer Science and Technology, vol. 15, page 514).

In the resin polymer composition, the ratio of component (a) to component (b) is not specifically limited. However, the resin polymer (a) can be employed in an amount of from 10 to 95 parts by weight, preferably from 30 to 90 parts by weight, and the styrene polymer (b) can be employed in an amount of from 5 to 90 parts by weight, preferably from 10 to 70 parts by weight.

The composition of the present invention can be obtained in a common blending method using, for example, an extruder. Alternatively, the styrene polymer (b) can be added to the reaction system for producing a resin polymer (a) of the present invention from PPE and a styrene monomer.

In the practical use of the present composition, the composition as such can be used, or the composition can be used in combination with other polymers so long as the characteristics of the composition are not impaired. Representative examples of other polymers include polyolefins, polyamides and polybutadienes. In addition, glass fiber, carbon fiber, inorganic fillers such as carbon black, plasticizers, fire retardants, stabilizers and the like can be added to the composition in accordance with conventional practice.

The composition of the present invention exhibits not only excellent moldability but also excellent color tone of an ultimate article derived from the composition, and has particularly excellent physical properties, such as moldability, color tone, impact resistance, elongation and surface gloss.

DETAILED DESCRIPTION OF PREFERRED EMBODIMENTS

The present invention will now be described in more detail with reference to the following Examples and Comparative Examples.

EXAMPLES 1 TO 4

Poly(2,6-dimethyl-1,4-phenylene)ether having an intrinsic viscosity of 0.55 dl/g as measured at 30° C. in chloroform was employed as PPE.

To 100 parts by weight of the above-identified PPE was separately added styrene in an amount indicated in Table 1. The resultant mixture was uniformly blended in a Henschel mixer, and then the blend was melted and kneaded at 300° C. using a twin screw extruder (30 mm in screw diameter, counterrotating) with a vent while discharging the excess styrene from the vent under vacuum, to thereby obtain pellets. 10 g of the thus obtained pellets were dissolved in 150 ml of methylene chloride, the resultant solution was allowed to stand at −5° C. for a whole day and night to deposit a complex of the desired resin polymer with methylene chloride. The deposit was filtered, washed with cooled methylene chloride and then dried at 140° C. under reduced pressure for 1 hour to obtain a sample polymer. This sample polymer was subjected to infrared absorption spectrum analysis to determine the amount of the low molecular weight polystyrene bonded to PPE in the polymer. With respect to the number average polymerization degree of the low molecular weight polystyrene bonded to PPE, the sample polymer was subjected to $^{13}$C-NMR analysis to obtain a NMR chart showing a signal due to the carbon at the C-1 position of the aromatic ring at the terminal of the polystyrene and a signal due to the carbon at the C-4 position of the aromatic ring in the main chain of the polystyrene, and the intensity ratio of the two signals was calculated to determine the number average polymerization degree of the low molecular weight polystyrene bonded to PPE. The carbon at the C-1 position and the carbon at the C-4 position are illustrated as follows.

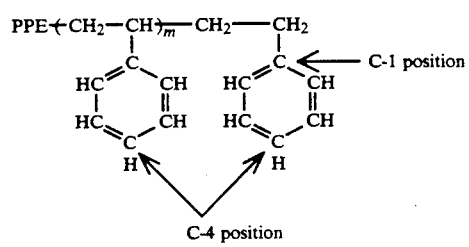

wherein $9 \geq m \geq 0$

Further, the intrinsic viscosity of the sample polymer was measured at 30° C. in chloroform.

To evaluate the moldability of the polymer, the melt viscosity of the pellet was measured by means of Capirograph (manufactured and sold by Toyo Seiki K.K., Japan) at 280° C. at a shear rate of $10^3 \sec^{-1}$. To evaluate the heat resistance of the polymer, the pellet was injection molded to obtain an injection molded article, whose heat distortion temperature was then measured. With respect to the color tone of the polymer, 0.5 g of the pellets was dissolved in chloroform so as to form a 100 ml chloroform solution. The absorbance at 480 nm of the solution was measured at 25° C., and the color tone was determined in accordance with the following equation:

$$\text{Color tone} = \frac{\log(Io/I)}{a \times b} \times 100$$

where
Io is the intensity of the incident light,
I is the intensity of the transmitted light,
a is the length of a cell (cm), and
b is the concentration of the solution (g/cm$^3$).

With respect to color tone, when the value obtained from the above equation is low, the heat-discoloration of the polymer is low, and the polymer is judged to have high thermal stability.

The results of the above measurements are shown in Table 1. The obtained pellets showed an excellent moldability and a heat resistance.

Incidentally, the pellets obtained in Example 1 contained a styrene polymer which was not bonded to PPE in an amount as low as 1.0% by weight, but there was no substantial adverse effect on the polymer properties of the pellets.

TABLE 1

|  | Example 1 | Example 2 | Example 3 | Example 4 |
|---|---|---|---|---|
| Formulation |  |  |  |  |
| PPE (pbw) | 100 | 100 | 100 | 100 |
| Styrene (pbw) | 5 | 10 | 20 | 30 |
| Polymer obtained from deposit from methylene chloride[1] |  |  |  |  |
| Amount of bonded styrene polymer (wt. %) | 0.7 | 1.2 | 1.8 | 2.5 |
| Number average polymerization degree of bonded styrene polymer | 7.3 | 6.4 | 6.2 | 5.9 |
| Intrinsic viscosity (dl/g) | 0.58 | 0.56 | 0.55 | 0.53 |
| Properties of polymer |  |  |  |  |
| Melt viscosity (poise) | 16,000 | 14,000 | 13,000 | 12,000 |
| Heat distortion temperature[2] (C°) | 185 | 182 | 180 | 178 |
| Color tone | 5.8 | 5.3 | 4.9 | 4.8 |

Note:
[1]Polymer obtained from deposit from methylene chloride means a polymer comprising PPE and a low molecular weight polystyrene bonded to the PPE.
[2]Heat distortion temperature test method in accordance with ASTM D-648.

COMPARATIVE EXAMPLE 1

100 parts by weight of the same PPE as used in Example 1, without addition of styrene, was pelletized at 300° C. using the same twin screw extruder as used in Example 1. The load was large during the extrusion, and the strand take-up performance was extremely poor. Therefore, it was impossible to continue to pelletize PPE. A portion of the PPE in the form of a strand was cut off and dissolved in methylene chloride. From the resultant solution a sample polymer was prepared in substantially the same manner as in Example 1. The thus obtained sample polymer had an intrinsic viscosity of 0.70 dl/g as measured at 30° C. in chloroform. From this, it was found that the molecular weight of PPE was considerably increased due to the thermal history during the extrusion.

COMPARATIVE EXAMPLES 2 and 3

Substantially the same procedures as described in Example 2 were repeated except that in kneading the blend, di-tert-butyl peroxide as radical polymerization initiator was added in the amount indicated in Table 2.

TABLE 2

|  | Comparative Example 2 | Comparative Example 3 |
|---|---|---|
| Amount of di-tert-butyl peroxide (wt. %) | 0.5 | 1.0 |
| Polymer obtained from deposit from methylene chloride |  |  |
| Amount of bonded styrene polymer (wt. %) | 6.3 | 8.8 |
| Number average polymerization degree of bonded styrene polymer | 4.3 | 3.5 |
| Intrinsic viscosity (dl/g) | 0.64 | 0.67 |
| Properties of polymer |  |  |
| Melt viscosity (poise) | 21,000 | 23,000 |
| Heat distortion temperature (°C.) | 157 | 151 |
| Color tone | 7.5 | 8.4 |

With respect to a sample polymer obtained in Comparative Examples 2 and 3 in which a radical polymerization initiator was used, as is apparent from Table 2, the amount of polystyrene bonded to PPE became large and the intrinsic viscosity of the polymer became high, so that not only the moldability and heat resistance but also the color tone of the polymer became poor.

COMPARATIVE EXAMPLES 4 and 5

Substantially the same procedures as described in Example 3 were repeated except that the temperature for extrusion was changed to 230° C. (Comparative Example 4).

Substantially the same procedures as described in Example 3 were repeated except that the temperature for extrusion was changed to 230° C., and in kneading the blend, 1.0 part by weight of di-tert-butyl peroxide as radical polymerization initiator was added (Comparative Example 5).

The properties of the obtained polymers are indicated in Table 3.

TABLE 3

|  | Comparative Example 4 | Comparative Example 5 |
|---|---|---|
| Amount of di-tert-butyl peroxide (wt. %) | 0 | 1.0 |
| Polymer obtained from deposit from methylene chloride |  |  |
| Amount of bonded styrene polymer (wt. %) | 0.3 | 5.6 |
| Number average polymerization degree of bonded styrene polymer | 15 | 11 |
| Intrinsic viscosity (dl/g) | 0.63 | 0.66 |
| Properties of polymer |  |  |
| Melt viscosity (poise) | 21,000 | 24,000 |
| Heat distortion temperature (°C.) | 185 | 156 |
| Color tone | 6.4 | 7.6 |

As is apparent from Table 3, in Comparative Examples 4 and 5, the number average polymerization degree of the polystyrene bonded to PPE of each of the obtained polymers was high, so that the intrinsic viscosity of each polymer derived from the deposit from methylene chloride was high. This means that the polymer has a high melt viscosity and correspondingly poor moldability.

EXAMPLE 5

To 90 parts by weight of the same PPE as used in Example 1 were added 10 parts by weight of a hydrogenated styrene-butadiene block copolymer (tradename: Tuftec H1051: manufactured and sold by Asahi Kasei Kogyo K.K., Japan) and 10 parts by weight of styrene, and then the resultant blend was pelletized in the same manner as in Example 1 to obtain the desired composition in the form of pellets. The resultant pellets were dissolved in methylene chloride to obtain a solution, and the solution was allowed to stand to cause a complex of PPE with methylene chloride to be deposited under the same conditions as in Example 1. The deposit was filtered and washed with methylene chloride to obtain a sample polymer. With respect to the thus obtained sample polymer, the intrinsic viscosity and the number average polymerization degree of the styrene polymer bonded to PPE were measured in the same manner as in Example 1.

The polymer properties of the composition were also measured in the same manner as in Example 1. The results are shown in Table 4.

TABLE 4

| Polymer obtained from deposit from methylene chloride | |
| --- | --- |
| Amount of bonded styrene polymer (wt. %) | 1.3 |
| Number average polymerization degree of bonded styrene polymer | 6.5 |
| Intrinsic viscosity (dl/g) | 0.57 |
| Properties of composition | |
| Melt viscosity (poise) | 15,000 |
| Heat distortion temperature (°C.) | 178 |

The molded article derived from the composition had excellent transparency and mechanical strength properties.

EXAMPLES 6 TO 9 AND COMPARATIVE EXAMPLE 6

To 50 parts by weight of the same PPE as used in Example 1 were added 50 parts by weight of polystyrene (tradename: Styron 685 manufactured and sold by Asahi Kasei Kogyo K.K., Japan). Styrene was also added in the amounts indicated in Table 4 (in Comparative Example 6, no styrene was added), followed by sufficient agitation in a Henschel mixer. The resultant blend was melted and kneaded at 290° C. using the same twin screw extruder as in Example 1 to obtain a composition in the form of pellets. Substantially the same procedures as in Example 1 were repeated to obtain a sample polymer, and various properties of the sample polymer were measured. The polymer properties of the composition were also measured.

Separately, the above-obtained pellets were subjected to injection molding at 290° C. to obtain a plate having a size of 50×90×2 mm. In accordance with JIS L1015 method, whiteness (W(Lab)) of the plate was measured by means of a colorimetric color-difference meter (manufactured and sold by Suga Test Instrument Co., Ltd., Japan)

As the value of W(Lab) becomes large, the color tone of the composition becomes light and pale. The results are shown in Table 5.

TABLE 5

| | Comparative Example 6 | Example 6 | Example 7 | Example 8 | Example 9 |
| --- | --- | --- | --- | --- | --- |
| Formulation | | | | | |
| PPE (pbw) | 50 | 50 | 50 | 50 | 50 |
| Styrene (pbw) | 0 | 2 | 5 | 10 | 15 |
| PS (pbw) | 50 | 50 | 50 | 50 | 50 |
| Polymer obtained from deposit from methylene chloride[1] | | | | | |
| Amount of bonded styrene polymer (wt. %) | 0 | 0.6 | 1.1 | 1.7 | 2.7 |
| Number average polymerization degree of bonded styrene polymer | — | 7.8 | 6.7 | 6.5 | 6.2 |
| Intrinsic viscosity (dl/g) | 0.69 | 0.59 | 0.56 | 0.55 | 0.53 |
| Properties of composition | | | | | |
| Melt viscosity (poise) | 3,200 | 3,050 | 2,950 | 2,850 | 2,750 |
| Heat distortion temperature (°C.) | 125 | 125 | 124 | 124 | 123 |
| Whiteness of molded article W (Lab) | 26 | 33 | 46 | 56 | 58 |

As is apparent from Table 5, with respect to the pellet obtained in Comparative Example 6 in which no styrene was added, no styrene polymer bonded to PPE was detected in the polymer obtained from the deposit from methylene chloride and the intrinsic viscosity of the polymer was high so that the melt flow characteristics of the composition were poor. The color tone of the composition was also poor.

In contrast, in Examples 6 to 9 in which styrene was added, the polymer obtained from the deposit from methylene chloride had a low intrinsic viscosity comparable to that of PPE per se. The composition was excellent in color tone and melt flow characteristics.

COMPARATIVE EXAMPLES 7 AND 8

Substantially the same procedures as described in Example 7 were repeated except that in kneading the blend, di-tert-butyl peroxide as radical polymerization initiator was added in the amounts indicated in Table 6. The results are shown in Table 6.

TABLE 6

| | Comparative Example 7 | Comparative Example 8 |
| --- | --- | --- |
| Amount of di-tert-butyl peroxide (wt. %) | 0.5 | 1.0 |
| Polymer obtained from deposit from methylene chloride | | |
| Amount of bonded styrene polymer (wt. %) | 6.5 | 8.6 |
| Number of average polymerization degree of bonded styrene polymer | 4.8 | 3.9 |
| Intrinsic viscosity (dl/g) | 0.66 | 0.68 |
| Properties of composition | | |
| Melt viscosity (poise) | 3,100 | 3,150 |
| Heat distortion temperature (°C.) | 120 | 118 |

TABLE 6-continued

|  | Comparative Example 7 | Comparative Example 8 |
|---|---|---|
| Whiteness of molded article W (Lab) | 35 | 31 |

As is apparent from Table 6, with respect to the sample polymer obtained in Comparative Examples 7 and 8, the amount of the styrene polymer bonded to PPE was large and the intrinsic viscosity of each sample polymer was also large. Not only the moldability but also the heat resistance and the color tone of the composition was poor.

COMPARATIVE EXAMPLES 9 AND 10

Substantially the same procedures as described in Example 8 were repeated except that the temperature for extrusion was changed to 230° C. (Comparative Example 9).

Substantially the same procedures as described in Example 8 were repeated except that the temperature for extrusion was changed to 230° C. and that in kneading the blend, 1.0 part by weight of di-tert-butyl peroxide was added as radical polymerization initiator (Comparative Example 10).

The properties of the polymer obtained from the deposit from methylene chloride and those of the composition were measured in substantially the same manner as in Example 1. The results are shown in Table 7.

TABLE 7

|  | Comparative Example 9 | Comparative Example 10 |
|---|---|---|
| Amount of di-tert-butyl peroxide (part by wt.) | 0 | 1.0 |
| Polymer obtained from deposit from methylene chloride |  |  |
| Amount of bonded styrene polymer (wt. %) | 0.4 | 6.2 |
| Number of average polymerization degree of bonded styrene polymer | 15 | 12 |
| Intrinsic viscosity (dl/g) | 0.63 | 0.67 |
| Properties of composition |  |  |
| Melt viscosity (poise) | 3,100 | 3,150 |
| Heat distortion temperature (°C.) | 120 | 117 |
| Whiteness of molded article W (Lab) | 41 | 33 |

EXAMPLE 10 AND COMPARATIVE EXAMPLES 11 AND 12

A composition consisting of 55 parts by weight of the same PPE as used in Example 1, 45 parts by weight of a rubber-modified polystyrene (tradename: Styron 492 manufactured and sold by Asahi Kasei Kogyo K.K., Japan), 4 parts by weight of triphenyl phosphate as fire retardant and 0.5 part by weight of octadecyl-3-(3,5-di-tert-butyl-4-hydroxyphenyl)propionate (Irganox 1076) as stabilizer was blended with 9 parts by weight of styrene. The resultant blend was melted and kneaded at 290° C. to obtain the desired composition in the form of pellets.

Substantially the same procedures as described above were repeated except that no styrene was added to the composition (Comparative Example 11).

Separately, substantially the same procedures as described above were repeated except that not only 9 parts by weight of styrene but also 1.0 part by weight of di-tert-butyl peroxide were added, to obtain a composition in the form of pellets (Comparative Example 12).

Polymers were isolated from these compositions. Before isolating a polymer from the composition by treatment with methylene chloride, the rubbber component was preliminarily removed from the composition as follows: 18 g of the pellet was dissolved in chloroform. The resultant solution was subjected to centrifugation, and then the upper insoluble layer (rubber component) formed was separated. The residual chloroform solution was poured into methanol to recover a rubber component-free composition of polystyrene and PPE having a polystyrene bonded thereto. A polymer (PPE having PS bonded thereto) was obtained by treatment of the recovered composition with methylene chloride. The properties of the composition and those of the polymer obtained from the deposit from methylene chloride were examined in substantially the same manner as in Example 1. With respect to Izod impact strength, tensile strength, elongation and surface gloss, these properties were measured in accordance with the method shown in the foot note in Table 8 given below. The results are shown in Table 8.

TABLE 8

|  | Example 10 | Comparative Example 11 | Comparative Example 12 |
|---|---|---|---|
| Polymer obtained from deposit from methylene chloride |  |  |  |
| Amount of bonded styrene polymer (wt. %) | 1.6 | 0 | 8.8 |
| Number average polymerization degree of bonded styrene polymer | 7.3 | — | 4.2 |
| Intrinsic viscosity (dl/g) | 0.56 | 0.69 | 0.68 |
| Properties of composition |  |  |  |
| Melt viscosity (poise) | 3,000 | 3,350 | 3,300 |
| Whiteness of molded article W (Lab) | 45 | 20 | 36 |
| Heat distortion temperature (°C.) | 118 | 119 | 118 |
| Izod impact strength[1] (kgcm/cm) | 14 | 15 | 6 |
| Tensile strength[2] (kg/cm$^2$) | 630 | 630 | 640 |
| Elongation[3] (%) | 40 | 40 | 20 |
| Surface gloss[4] (%) | 75 | 70 | 58 |

Note:
[1] Izod impact strength test method in accordance with ASTM D-256
[2] Tensile strength test method in accordance with ASTM D-638
[3] Elongation test method in accordance with ASTM D-638
[4] Surface gloss test method in accordance with ASTM D-523

As is apparent from Table 8, the composition obtained in Example 10 had excellent melt flow characteristics. The color tone of the molded article was excellent.

In contrast, the composition obtained in Comparative Example 11 in which no syrene was added was extremely poor in melt flow characteristics and the molded article made therefrom was extremely poor in color tone. With respect to the composition obtained in Comparative Example 12 in which a high molecular weight styrene polymer was bonded to PPE in a large amount, the composition had poor melt flow characteristics, and the molded article made therefrom was poor in color tone, surface gloss and particularly in Izod impact strength.

To 100 parts by weight of each of the compositions obtained in Example 10 and Comparative Example 11 were separately added 2.5 parts by weight, 5 parts by weight and 10 parts by weight of tianium oxide as white colorant. The resultant blend was pelletized at 290° C. using a single screw extruder (40 mm in screw diameter) with a vent to obtain a composition in the form of pellets. To evaluate the susceptibility to coloring of the composition, a test piece was made from the obtained composition, and then the test piece was measured with respect to whiteness in accordance with JIS L1015 method. The results are shown in Table 9.

TABLE 9

|  | Whiteness Amount of titanium oxide (pbw) | | |
| --- | --- | --- | --- |
|  | 2.5 | 5.0 | 10 |
| Example 10 | 76 | 82 | 87 |
| Comparative Example 11 | 68 | 75 | 80 |

As is apparent from Table 9, the susceptibility to coloring of the composition of the present invention (Example 10) was considerably improved so that the amount of the colorant to be used can be reduced substantially as compared to the amount of the colorant necessary for coloring the conventional composition (Comparative Example 11).

What is claimed is:

1. A thermoplastic resin polymer having improved moldability and heat resistance, comprising a polyphenylene ether and a low molecular weight styrene polymer bonded to said polyphenylene ether, said low molecular weight styrene polymer having a number average polymerization degree of from 5.5 to 8.0 and being present in an amount of from 0.5 to 3.0% by weight, based on the weight of said polyphenylene ether.

2. The thermoplastic resin polymer according to claim 1, wherein the polyphenylene ether has an intrinsic viscosity of from 0.30 to 0.75 dl/g as measured at 30° C. in chloroform.

3. The thermoplastic resin polymer according to claim 1, wherein the low molecular weight styrene polymer is a low molecular weight styrene homopolymer.

4. The thermoplastic resin polymer according to claim 1, wherein the polyphenylene ether is poly(2,6-dimethyl-1,4-phenylene)ether.

* * * * *